United States Patent [19]
Farzan et al.

[11] Patent Number: 5,198,990
[45] Date of Patent: Mar. 30, 1993

[54] COORDINATE MEASUREMENT AND INSPECTION METHODS AND APPARATUS

[75] Inventors: Farshad Farzan, Encino; Valerie J. Gasio, Culver City, both of Calif.

[73] Assignee: Fanamation, Inc., Compton, Calif.

[21] Appl. No.: 512,477

[22] Filed: Apr. 23, 1990

[51] Int. Cl.⁵ .......................... G06F 15/46; G06F 3/00
[52] U.S. Cl. ............................. 364/560; 364/474.37; 395/200
[58] Field of Search ............... 364/559, 560, 474.01, 364/474.23, 474.24, 474.36, 474.37, 200, 900, 513; 33/1 M; 395/200, 80

[56] References Cited

U.S. PATENT DOCUMENTS

| | | | |
|---|---|---|---|
| 4,484,293 | 11/1984 | Minucciani et al. | 364/513 |
| 4,604,715 | 8/1986 | Toutant et al. | 364/513 |
| 4,610,089 | 9/1986 | Bell et al. | 33/1 M |
| 4,639,878 | 1/1987 | Day et al. | 364/513 |
| 4,653,011 | 3/1987 | Iwano | 364/513 |
| 4,703,443 | 10/1987 | Moriyasu | 364/559 |
| 4,724,525 | 2/1988 | Purcell et al. | 364/474.37 |
| 4,807,152 | 2/1989 | Lane et al. | 364/513 |
| 4,821,206 | 4/1989 | Arora | 364/513 |
| 4,829,419 | 5/1989 | Hyatt | 364/474.01 |
| 4,835,718 | 5/1989 | Breyer et al. | 364/560 |
| 4,881,177 | 11/1989 | McClean et al. | 364/474.37 |
| 4,901,218 | 2/1990 | Cornwell | 364/474.37 |
| 4,901,256 | 2/1990 | McMurtry et al. | 364/474.37 |

Primary Examiner—Kevin J. Teska
Attorney, Agent, or Firm—Patula & Associates

[57] ABSTRACT

Apparatus for measuring or inspecting an object in a coordinate measurement machine (CMM). The apparatus includes a frame having a reference table for supporting the object and a robotics unit secured to the frame. The robotics unit has a probe which generates output signals when the probe contacts the object, and the output signals are sent to a machine control unit which controls the robotics unit and calculates and displays results of inspections. The control unit is programmed to operate the CMM in predetermined ways responsive to DMIS or other widely-used syntax, without translating the DMIS syntax into another language or syntax.

12 Claims, 6 Drawing Sheets

FIG. 2A

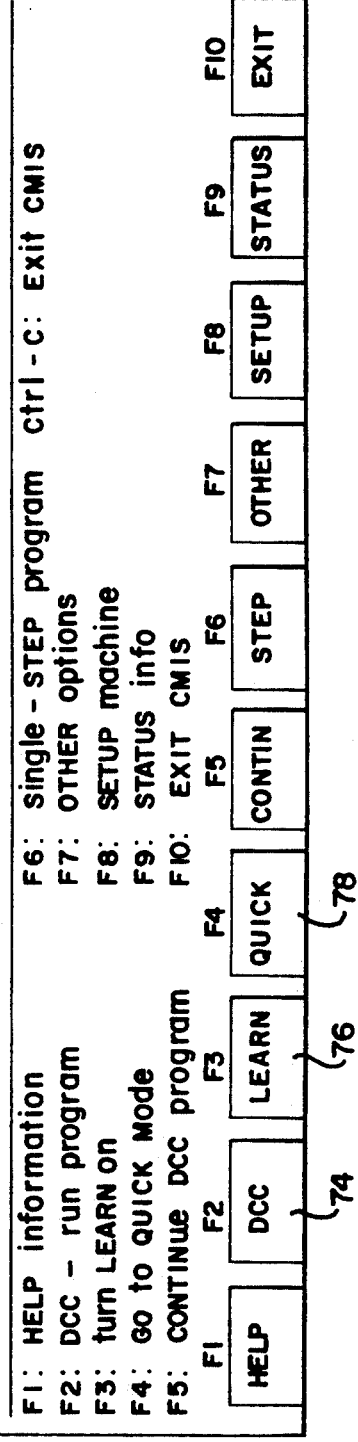

```
CMIS(r)  copyright(c)  1986-1989   Fanamation Inc,   Rev 2.48  COMERO 404024  S/N 100
MODE :       PROG     COORD :   MCS            TIME :    10:59:44
WKPLAN:      XY       FILE :    comero.bat     DATE :    2-1-1990
UNIT :       MM       OPMODE:   SELECT OP      FEAT :    NONE
```

END OF PART INSPECTION PROGRAM.
Initialization complete.

```
F1:  HELP information           F6:  single-STEP program   ctrl-c:  Exit CMIS
F2:  DCC - run program          F7:  OTHER options
F3:  turn LEARN on              F8:  SETUP machine
F4:  Go to QUICK Mode           F9:  STATUS info
F5:  CONTINue DCC program       F10: EXIT CMIS
```

| F1 | F2 | F3 | F4 | F5 | F6 | F7 | F8 | F9 | F10 |
|----|----|----|----|----|----|----|----|----|----|
| HELP | DCC | LEARN | QUICK | CONTIN | STEP | OTHER | SETUP | STATUS | EXIT |

| Line | DMIS file |
|---|---|
| 1 | DMISMN/'ANCRUN2.42' |
| | UNITS/INCH,ANGDEC |
| | PRCOMP/ON |
| | FINPOS/OFF |
| 5 | WKPLAN/XYPLAN |
| | DISPLY/STOR.V(F) |

```
   $$ RECALL/D(PCOI)

S(SNOI)=SNSDEF/PROBE,INDEX,POL,0.0,0.0,0,0,0,-1,0,0.0
   SNSLCY/S(SNOI)

10 FEDRAT/POSVEL,MPM,3.0
   FEDRAT/MESVEL,MPM,0.5

SNSET/APPRCH,0.15
   SNSET/RETRCT,0.15
   SNSET/SEARCH,0.2
15 SNSET/CLRSRF,2.0

MODE/AUTO,PROG,MAN

F(DATA)=FEAT/PLANE,CART,-1.0,-2.0,0,0,0,1
   MEAS/PLANE,F(DATA),4
   PTMEAS/CART,-2.0,-2.0,0.002,0,0,1
20 PTMEAS/CART,-2.0,7.0,0,0,0,1
   PTMEAS/CART,12.75,7.0,0,0,0,1
   PTMEAS/CART,12.75,-2.0,0,0,0,1
   ENDMES

D(PCOI)=TRANS/ZORIG,FA(DATA)

25 F(PLOI)=FEAT/PLANE,CART,5.375,2.5,1.5,0,0,-1
   MEAS/PLANE,F(PLOI),3
   PTMEAS/CART,10.00,2.50,1.50,0,0,1
   GOTO/10.00,2.50,4.65
   GOTO/0.25,4.75,4.65
30 PTMEAS/CART,0.25,4.75,1.50,0,0,1
   PTMEAS/CART,0.375,0.25,1.50,0,0,1
   ENDMES

F(CYLI)=FEAT/CYLNDR,INNER,CART,0.75,0.75,0.75,0,0,1,0.500
   MEAS/CYLNDR,F(CYLI),8
35 ENDMES
   BOUND/F(CYLI),FA(DATA),FA(PLOI)
   OUTPUT/FA(CYLI)

38 ENDFIL
```

COORDINATE MEASUREMENT AND INSPECTION METHODS AND APPARATUS

This invention relates to measurement methods and apparatus, and more particularly, to automated, precision measurement methods and apparatus for inspection and design.

BACKGROUND OF THE INVENTION

A workpiece or other object can be measured for purposes of inspection or design with automated measurement and inspection apparatus, commonly called a co-ordinate measuring machine, or CMM. Such machines generally include a reference table for the workpiece, a movable probe which generates output signals when the probe contacts the workpiece, and a processing system for controlling the probe and calculating and reporting results.

Since most objects can be defined as a combination of familiar shapes and lines, computer systems for measurement and inspection equipment are often programmed with several sub-routines which manipulate the probe to perform basic functions, such as measuring circles, ellipses, lines, planes and other simple geometric figures. These basic sub-routines are then executed in a user selected order to measure a particular workpiece. This is an efficient approach to programming because it allows workpieces of varying shapes and sizes to be measured without creating unique sub-routines for each workpiece.

Measurement and inspection equipment which uses a computer system programmed to perform several basic functions is available from many manufacturers. However, it is customary for each manufacturer to create a unique protocol or syntax for identifying and executing the various basic sub-routines to perform operative functions. Also, in some cases machines made by different manufacturers perform basic operative functions in different ways. The lack of standard syntax for calling basic sub-routines to perform basic functions, and standard approaches to performing those functions, has created problems which the industry has addressed by adopting a standard syntax for identifying and performing these basic functions, called Dimensional Measuring Interface Specification, Version 2.1 ("DMIS"). DMIS was prepared by Computer Aided Manufacturing-International, Inc., Arlington, Tex.

While some manufacturers have adapted their measurement and inspection equipment to be compatible with DMIS, they have done so by providing a translator which converts commands in the standard DMIS syntax into their own unique command syntax. The use of such translators is inefficient because it slows the operation of the equipment, and adds expense because of the added hardware and software needed to accomplish the translation. Thus, there is a need for automated measurement and inspection methods and apparatus which perform basic functions in response to commands in a standard syntax format such as DMIS, without translating the DMIS commands into another format.

CMM's are used to inspect workpieces having a known geometry recorded in an engineering drawing and/or computer aided design (CAD) or computer aided manufacturing (CAM) database. The workpiece can be inspected by taking either the drawing or the database and creating a series of instructions, i.e., a file or part program, for the part. However, such manual programming is tedious and time-consuming, and may need substantial editing and revisions. Thus, there is also a need for automated measurement and inspection methods and apparatus which can create part files for particular workpieces, without manual programming.

Some CMM's are available which automatically generate a part file for a workpiece of unknown dimensions for use in a CAD system, as the operator manually measures the workpiece with the CMM. However, without a standard format or protocol for initiating the various standard subroutines, part files cannot be easily created on one system and later transferred to another because of differences in the interfaces of the machines. The standard syntax used in DMIS allows CAD/CAM systems and CMM's to easily exchange DMIS part files, but existing CMM's require post-processing to translate the DMIS commands into another syntax. Such post-processing requires additional hardware and software, and increases the processing time significantly. Thus, there is also a need for automated measurement and inspection methods and apparatus which create CAD/CAM part files which use DMIS protocol, without such additional translators, compilers or the like.

Accordingly, one object of this invention is to provide new and improved measurement and inspection methods and apparatus.

Another object is to provide new and improved automated, precision measurement and inspection methods and apparatus which perform basic measurement functions in response to commands in a standard syntax format such as DMIS, without translating the DMIS or other standard commands into another format.

Yet another object is to provide new and improved automated measurement and inspection methods and apparatus which create CAD/CAM part files which use DMIS protocol, without translating the DMIS syntax to another protocol.

Still another object is to provide new and improved automated measurement and inspection methods and apparatus which can be operated by remote control, using keypads having designated keys for defining operations which the apparatus performs, and the manner in which the operations are performed.

SUMMARY OF THE INVENTION

In keeping with one aspect of this invention, apparatus for measuring or inspecting an object in a coordinate measurement machine (CMM) includes a frame assembly unit having a reference table for supporting the object, a robotics unit secured to the frame assembly, and a machine control unit for controlling the robotics unit. The robotics unit has a probe which is used to inspect the object by generating output signals when the probe contacts the object.

The machine control unit is programmed to calculate dimensions and points on the object from the output signals of the probe and output signals from associated linear encoders. In one mode, called the DCC mode, for direct computer control, the program inspects the object by executing a part file made up of commands in DMIS or some other widely used syntax standard, without translating the DMIS commands into another language. In the Quick mode, the control unit inspects the object in response to commands entered by the operator by moving joysticks and pressing control keys in a remote control unit. The machine is also programmed to operate in a Learn mode, in which an inspection sequence is stored in a DMIS file as the operator performs the desired sequence using the joysticks and control keys. The CMM, programmed to accept DMIS commands, can also be used with a CAD/CAM system, and can be used in an automated factory, without peripheral equipment which changes the protocol of the commands which determine the sequence in which the workpiece is inspected.

BRIEF DESCRIPTION OF THE DRAWINGS

The above-mentioned and other features of the invention and the manner of obtaining them will become more apparent, and the invention itself will be best understood by reference to the following description of an embodiment of the invention taken in conjunction with the accompanying drawings, in which:

FIG. 2A is a view of a display screen showing the designation of keyboard function keys for performing selected apparatus functions;

FIG. 5 is a listing of a DMIS file which could be used in the present invention.

DETAILED DESCRIPTION

Figure 1:
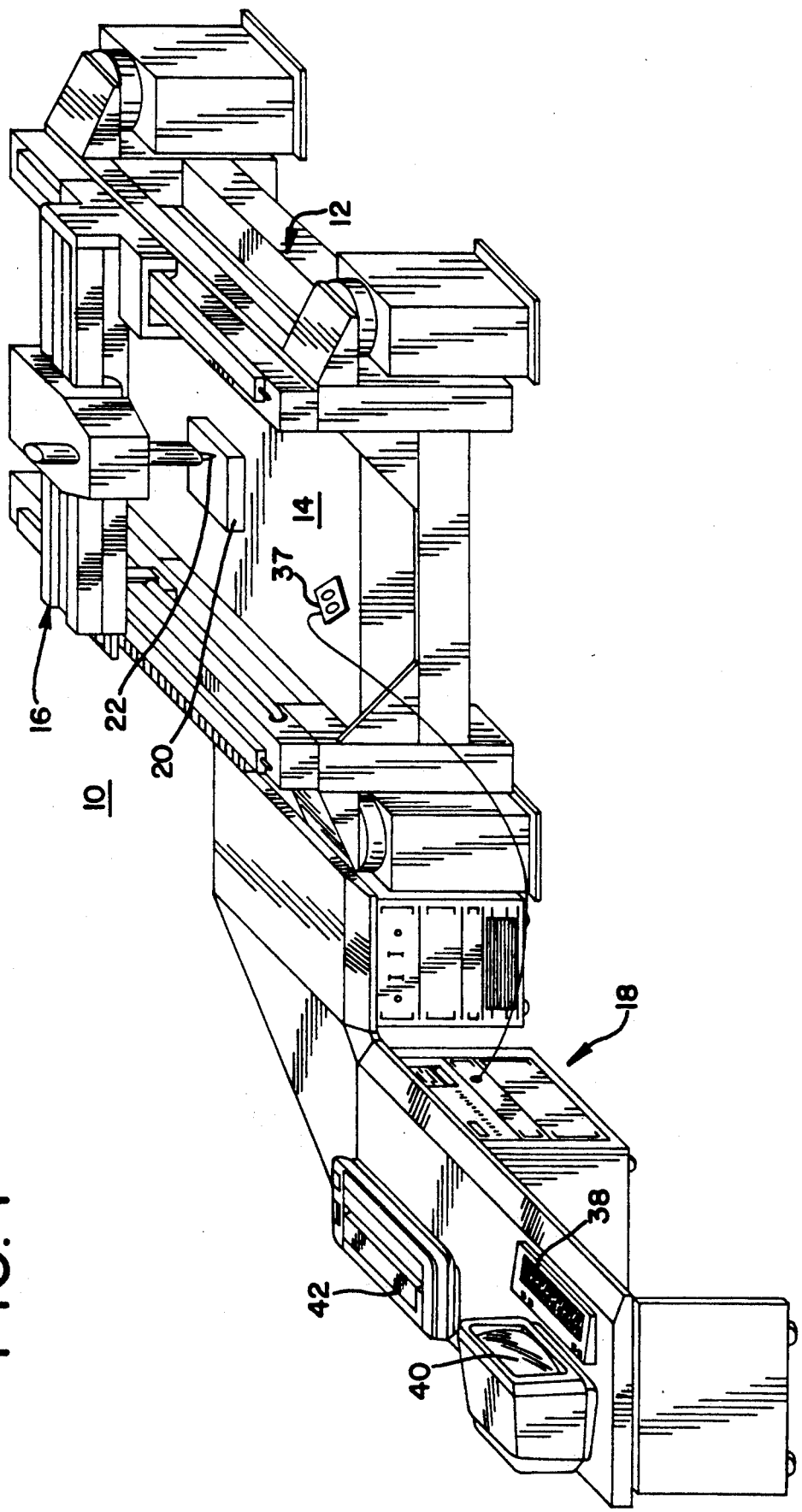
FIG. 1 is an isometric view of measurement and inspection apparatus made in accordance with the principles of the invention.

As seen in FIG. 1, apparatus 10 is a coordinate measuring machine (CMM) which includes a frame assembly 12 having a reference table 14, a robotics unit 16 secured to the frame assembly 12, and a machine control unit 18 which is operatively connected to the robotics unit 16. The apparatus 10 is used to measure or inspect the dimensions of an object 20, which is placed on the reference table 14 by an operator.

The dimensions of the object 20 are measured by a probe 22 which is part of the robotics unit 16. The probe 22 can be any suitable device, such as a touch probe which makes physical contact with the workpiece, or a laser device, video camera or other device which does not make physical contact with the workpiece, but recognizes the surfaces of the workpiece.

The probe 22 is controlled by the control unit 18 to make physical or other suitable contact with the object 22 at predetermined points on the object. When the probe 22 contacts the object 20, signals are generated which are input to the control unit 18 for processing. The control unit 18 uses the signals to calculate desired information and display the results of the calculations in a desired manner. For example, the probe 22 can contact several points in a circle or on a plane, and using the output signals of the probe 22 and output signals from liner encoders in the apparatus 10 (not shown in FIG. 1), the control unit 18 can then calculate the roundness and radius of the circle or the flatness of the plane, and display the calculations in a selected format.

Figure 2:
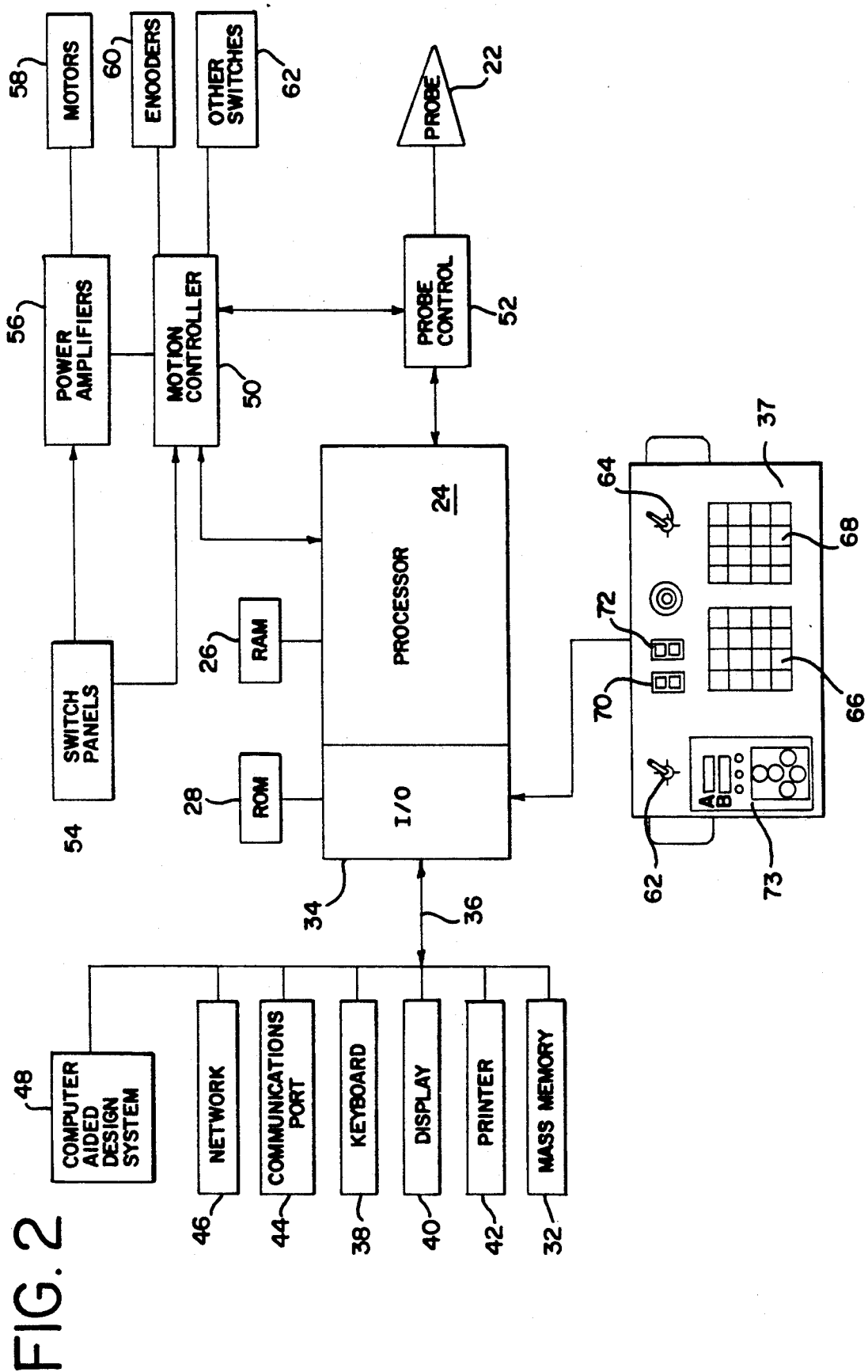
FIG. 2 is a block diagram of the control system used in the apparatus of FIG. 1.

The control unit 18 is shown in greater detail in FIG. 2, and includes a main data processor 24, a volatile random access memory (RAM) 26, read only memory (ROM) 28 coupled to the processor 24, and a mass storage memory 32, which could be a hard disk drive, coupled to an input/output device 34 through a bus 36. A remote control unit 37, a keyboard 38, a display 40 and a printer 42 are also connected to the main processor 24 through the input/output channels 34. A communications port 44, a connection to a computer network 46, and another port 48 for connection to a computer aided design (CAD)/computer aided manufacturing (CAM) system are also provided. Additional peripheral devices can be used with this invention if desired.

The control unit 18 preferably has an operating system which is capable of multi-tasking, and could be UNIX, VRTX, an internally developed system, or any other suitable operating system. The control unit 18 could include an International Business Machine personal computer such as an "AT" model computer, or an IBM-compatible personal computer, although it is contemplated that the invention could also be practiced with a minicomputer system, or a main frame computer system.

The display 40 may be a conventional CRT screen, LCD screen or other suitable color or black and white display device for providing alphanumeric and/or graphic display capabilities. The keyboard 38 may include an ASCII encoder or other suitable encoder and a separate set of letter and numeric keys and function keys to permit communication between the control unit 18 and the operator. The printer 42 may be any of a variety of conventional printers, including laser printers, suitable for providing printed output.

FIG. 2 shows the manner in which the robotics unit 16 is connected to the control unit 18 schematically. The robotics unit 16 includes a motion controller 50 and a probe controller 52 which are connected to the control unit 18. A switch panel 54 and power amplifiers 56 are connected to the motion controller 50, and a plurality of motors 58 are connected to the power amplifiers 56. The motors 56 move the probe 22, which is connected to the probe controller 52, in a desired manner. Encoders 60 and other switches 62 are connected to the motion controller 50 for locating and measuring movement of the probe 22.

Figure 3:
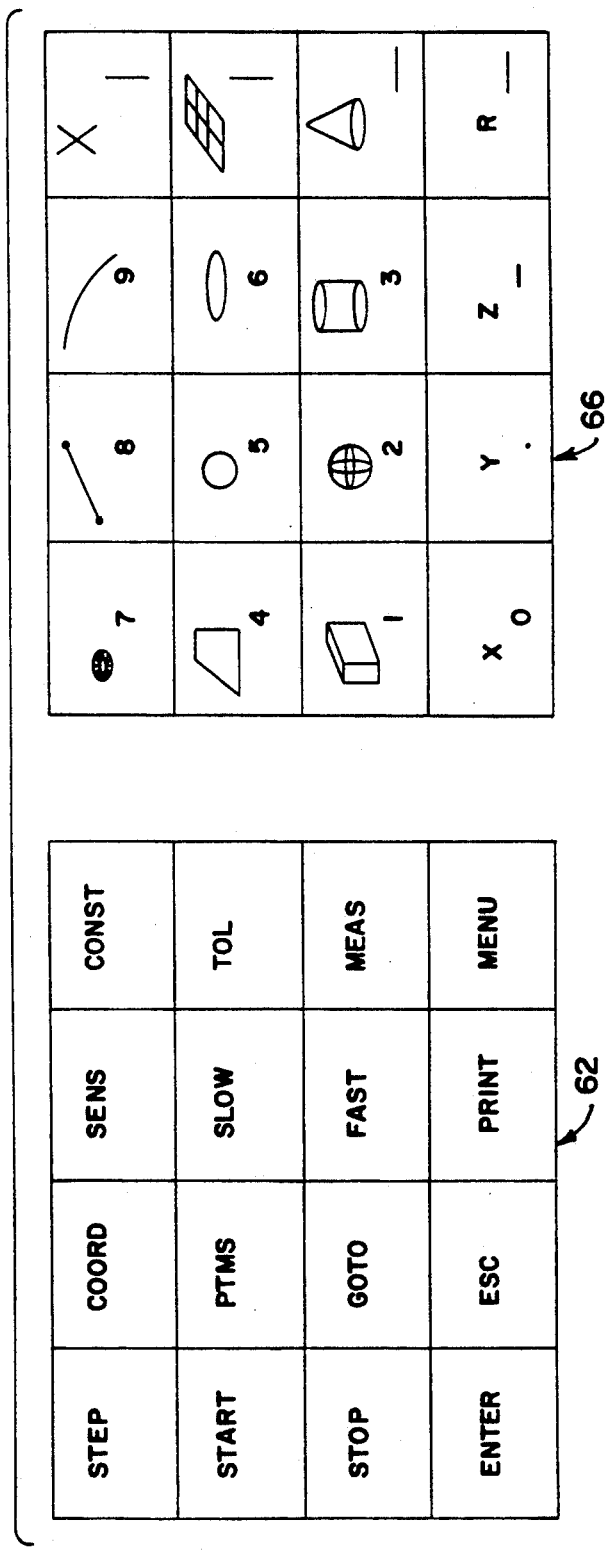
FIG. 3 is a diagram of keys in a control unit used in the apparatus of FIG. 1.

The remote control unit 37 includes two joysticks 62 and 64, a geometric form/numeric selection keypad 66, and a physically separate command pad 68, shown in greater detail in FIG. 3. The selection keypad 66 defines operations which the CMM performs, and the command keypad 68 defines the manner in which the CMM operations are executed. The joysticks 62 and 64 are used to manually move the probe 22 in three geometric planes.

The remote unit 37 also has a power on/off switch 70 for controlling the power to the entire apparatus 10, a servo on/off switch 72 for controlling power to the motors 58, and a probe position controller 73.

A "DCC" mode select switch 74, a "Learn" mode select switch 76 and a "Quick" mode select switch 78 are designated on the keyboard 38, as seen in the display screen shown in FIG. 2A.

In the DCC (direct computer control) mode, the program in the control unit 18 executes a series of subroutines as defined in an existing part file. The part file is a series of commands which use the DMIS command syntax to be described. The program in the control unit 18 interprets and executes DMIS commands directly, without translating the DMIS protocol into a different language. In the DCC mode, the program can be executed either without operator assistance or it may require, if specified, the operator to make manual measurements using the joysticks at various times in the process.

In the Quick mode, the operator uses the joysticks 62, 64, the keyboard 38 and the remote unit 37 to measure features of the object 20, and in the Learn mode, instructions generated are stored and later used to measure similar parts in the DCC mode.

Thus, the main modes of operation of the machine are controlled by pushing designated keys such as 74, 76 and 78 in FIG. 2A. Keys identified as STEP, START, STOP, ENTER, MEAS, and ESCAPE (ESC) on the keypad 68 control the operation of the apparatus, and place the apparatus in one of four operating states which are related to the mode of operation selected. As will now be seen, not all control keys are operable in the various operating states.

Figure 4:
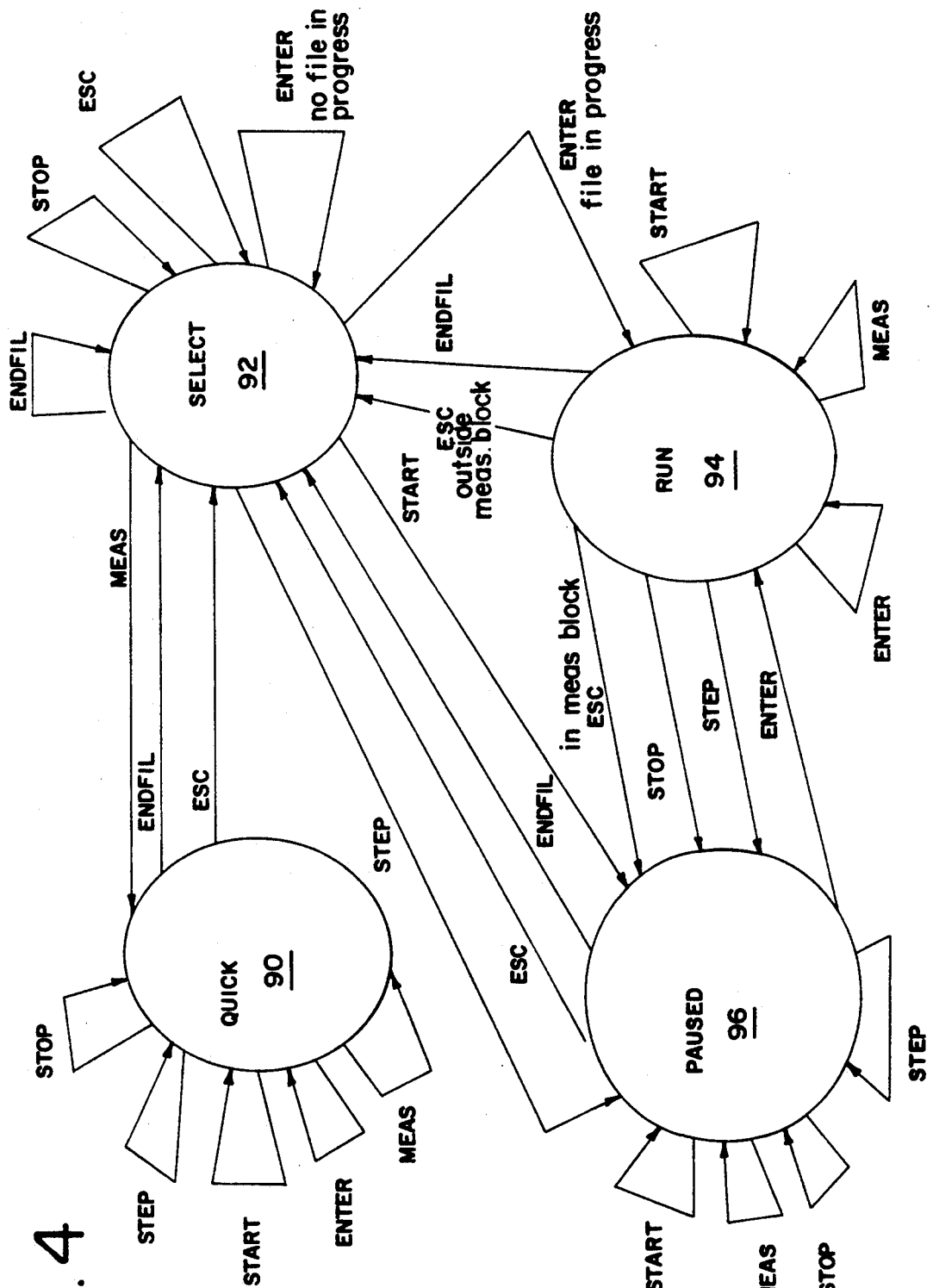
FIG. 4 is a flow chart showing the operating states of the apparatus of FIG. 1, and the manner in which they interact.

A flow chart showing the four operating states in which the system operates, and the manner in which the states are controlled, is shown in FIG. 4. Generally, the states are controlled by the STEP, START, STOP, ENTER, MEAS, and ESCAPE keys on the keypad 68 of FIGS. 2 and 3, commands in the program, and end of file commands (ENDFIL) which cause the apparatus to re-set after execution of a file is completed. The START key initiates a program or sub-routine and the STOP and ESC keys terminate a program. The STEP key advances a program a single routine or subroutine, after which the machine stops and waits for further commands. The MEAS key allows the operator to take measurements with the joysticks 62, 64. However, certain commands are only accepted when the apparatus is not executing a series of commands in a measuring block in which a particular function is being performed, as seen in FIG. 4.

The system's default state is Select State 92 (FIG. 4). In the default state, the START event instructs the software to open a selected DMIS part file and place the apparatus in Paused State 96.

If the apparatus 10 is in the Select State 92 and the operator issues an ENTER event, the system enters the Run State 94 and executes the part file if a file is in progress. In the Select State 92, the STEP event sends the system into Paused State 96. The MEAS event when the system is in the Select State 92 sends the system to the Quick State 90.

If the system is in the Run State 94, the STOP event sends the system into Paused State 96, which pauses the program and the apparatus until the operator commands the system to continue executing the file, or to abort the file. In the Run State 94, the STEP event instructs the software to execute only one line of the DMIS file and then pause in Paused State 96. The ESC event instructs the software to leave the run or paused states and return to the Select State 92, provided that the system is outside of a measuring block. In states 94 and 96, ENDFIL event indicates that execution of a file is completed, and leaves the system in the Select State 92 to await further commands.

While the system is in the Run State 94, it executes the file continuously and inspects the workpiece. This state can be activated from the Select State 92, or from the Paused State 96 with an ENTER event.

While in the Run State 94, the STOP or STEP events take the system into the Paused State 96, so the program can be stopped during execution and the operator can decide whether to stop the program or continue it with the ENTER event.

The system enters the Paused State 96 in FIG. 4 by a STEP or STOP event from the Run State 94 or by a STEP event from the Select State 92. The Paused State 96 is only entered when a file is open and in progress. In the Paused State 96, the system waits for an event other than STOP, START, or MEAS, which have no significance in the Paused State 96. The STEP event executes a line from the file and the software will stay in the Paused State 96. ENTER places the system in the Run State 94. ESC places the system in the Select State 92 if the system is outside of a measuring block.

In the Quick mode, the operator can use keys on the remote unit 37 to inspect a workpiece and send the results of the inspection to any combination of output devices such as the display 40, a file, or the printer 42, in any output format.

If the operator chooses to record the sequence of inspection as it is performed, the Learn mode 76 should be selected, and the output sequence will be in the DMIS or other widely used format standard. The DMIS output can be recorded in a disk file by selecting the Learn mode and entering a command to open a Learn file.

Returning now to FIG. 3, the keys on the keypad 68 can be segregated according to different functions. The operation control keys are STEP, START, STOP, ENTER, MEAS and ESCAPE, as previously discussed. The keys which are used in the Quick mode are the COORD, SENS, CONST, TOL and MENU keys. The SLOW and FAST keys set motion parameters for setting the speed of the probe 22, and the GOTO key is used in the Learn mode.

The COORD key creates a menu of coordinate system operations, such as translate and rotate. The SENS key provides a menu of probe operations for changing the probe position, or to recall or select a sensor definition. The MENU key allows the operator to change the workplanes and perform other miscellaneous functions, and the PRINT key prints results of a feature measurement, construction or tolerancing operation.

The CONST key on keyboard 68 displays a menu of construction operations which are useful in the inspection process. For example, an imaginary circle can be constructed by measuring a series of bolt holes in a workpiece and then calculating the best fit circle through their centers.

The TOL key is used to set tolerances for particular measurements by displaying a menu of tolerancing operations. The GOTO key indicates an intermediate point in the Learn mode.

The keypad 66 includes context sensitive keys which permit the selection of different geometric features which the machine can inspect. The same keys can also be used as a numerical keyboard for entering numbers in the Quick and Learn modes, for example. The X, Y, Z, and R are additional context sensitive keys that are used as arguments. For example, a menu might request the X command to select the X axis or the X origin, the Y command to select the Y axis or Y origin or the Z command to select the Z axis or the Z origin.

In the Quick mode, the geometrical keys allow the user to begin measurement of a feature. For example, the 2/sphere key is used to define a sphere, and the 3/cylinder key defines a cylinder. The right arrow/cone key defines a cone, the 5/circle key defines a circle, the 6/ellipse key defines an ellipse, the 8/line key defines a line, and the 9/arc key defines an arc line. The up arrow key defines a curve, and the 4/plane key defines a plane. Generally, geometric figures are defined in terms of a number of defined points, and the location of the points.

The keypad 66 is used in the following manner. If the operator is in the Learn mode, for example, the operator could enter a point command (7) and then measure a point with the probe 22. The operator could enter the plane command (4), and define the plane by measuring several points on the plane with the probe 22. The operator presses the ENTER command to get the results. To measure a tolerance, the operator can enter TOL on keyboard 68 to call up a menu which prompts the operator to select an acceptable degree of flatness or some other tolerance for a feature.

When the apparatus 10 is used in the Learn mode, the workpiece is placed on the table 14 and the Learn mode is selected. The joysticks 62, 64 are used to move the probe to the first surface, for example, and then "7" GOTO is entered on keyboard 66 to record the point where the probe is at that time. When all desired points are taken in this manner, an ENTER command gives the results of the inspection. Throughout this process, the measuring sequence is automatically recorded in a file which uses standard syntax such as DMIS.

The DMIS 2.1 commands use the following protocol or syntax. The basic structure of a command is as follows:

PRIMARY WORD/SECONDARY WORD(S), PARAMETER(S)

The primary and secondary words indicate the type of command. The following commands are standard DMIS commands, with the function which each command is used to define shown in the right-hand column:

| Command | Function |
|---|---|
| FEAT/ARC | Arc |
| FEAT/CIRCLE | Circle |
| FEAT/CONE | Cone |
| FEAT/CYLNDR | Cylinder |
| FEAT/ELLIPS | Ellipse |
| FEAT/GCURVE | Curve |
| FEAT/GSURF | Surface |
| FEAT/LINE | Line |
| FEAT/PARPLN | Parallel planes |
| FEAT/PATERN | Pattern |
| FEAT/PLANE | Plane |
| FEAT/POINT | Point |
| FEAT/RAWDAT | Raw data output |
| FEAT/RCTNGL | Right rectangular prism |
| FEAT/SPHERE | Sphere |
| TOL/ANGL | Angular tolerance |
| TOL/DIAM | Diameter tolerance |
| TOL/RAD | Radial tolerance |
| TOL/WIDTH | Linear size tolerance |
| TOL/CIRLTY | Circular tolerance |
| TOL/CYLCTY | Cylindrical tolerance |
| TOL/FLAT | Flatness tolerance |
| TOL/STRGHT | Straightness tolerance |
| TOL/PROFL | Line or curve tolerance |
| TOL/PROFS | Surface tolerance |
| TOL/CRNOUT | Circular run out tolerance |
| TOL/TRNOUT | Total run out tolerance |
| TOL/ANGLB | Defines an angle and a tolerance |
| TOL/ANGLR | Defines an angle tolerance |
| TOL/DISTB | Defines a distance and a tolerance |
| TOL/PARLEL | Tolerance of parallel items |
| TOL/PERP | Tolerance of perpendicular items |
| TOL/COMPOS | Tolerance of the position of items for use with patterns |
| TOL/CONCEN | Tolerance of concentric items |
| TOL/CORTOL | Tolerance of the position of bidirectional items in cartesian or polar coordinates |
| TOL/POS | Tolerance of the position of items with respect to each other |
| BOUND | Defines boundaries and tolerances for items that do not have actual boundaries |
| DATDEF | Identifies a previously measured feature |
| DATSET | Identifies a part coordinate system |
| RECALL | Retrieves previously stored data |
| DELETE | Deletes previously stored data |
| ROTATE | Adjusts a part coordinate system with respect to an axis |
| SAVE | Stores data in memory |
| TRANS | Adjusts a part coordinate system along an axis |
| WKPLAN | Defines or adjusts a working plane |
| SNSDEF | Identifies sensors used in making measurements |
| CALIB | Calibrates a sensor element or rotary table |
| SNSET | Identifies sensor settings |
| ALGDEF | Defines an algorithm |
| FILDEF | Identifies a filter for a video sensor |
| LITDEF | Identifies a lighting arrangement for a video sensor |
| SCNDEF | Identifies scanning settings |
| SCNGRF | Identifies scanning graphics settings |
| SCNPOS | Identifies starting and ending positions for scanning an item |
| WINDEF | Identifies a window for the field of view of a video sensor |
| SNSLCT | Identifies one or more sensors for measurement |
| THLDEF | Identifies an automatic tool, sensor holder or sensor changer |
| FILNAM | Printable text within a parts program |
| DMISMN | Printable text to identify parts programs externally |
| ACLRAT | Defines acceleration for sensor probes and rotary tables |
| ERROR | Defines machine error codes |
| FEDRAT | Defines velocities for sensor probes and rotary tables |
| FINPOS | Controls fine positioning of the sensor |
| MODE | Defines the operating mode of the CMM |
| PRCOMP | Controls automatic probe compensation |
| RAPID | Defines the probe speed |
| TECOMP | Controls temperature compensation |
| UNITS | Defines units of measurement |
| ROTDEF | Identifies a rotary table for a workpiece |
| ROTAB | Controls the motion of a rotary table |
| ROTSET | Defines the angular counter value for a rotary table |
| CRGDEF | Defines an independent sensor carrying carriage |
| ENDGO | Identifies the end of a GOTARG algorithm |
| ENDMES | Identifies the end of a measurement algorithm |
| FROM | Specifies an initial position to be used by the GOHOME command |
| GOHOME | Positions the sensor at the coordinates defined in a previous FROM command |
| GOTARG | Prepares the sensor for movement and defines its stopping point |
| GOTO | Moves the sensor and defines its stopping point |
| MES | Initiates the measurement of a feature |
| PTMEAS | Initiates the measurement of a point |
| CONST | Initiates the construction of a feature such as an arc, circle, cone, etc. |
| DECL | Identifies variable names and corresponding data type such as characters, integers, etc. |
| OBTAIN | Sets variables equal to any parameter of a definition |
| VALUE | Sets variables equal to measurement results |
| CUTCOM | Defines a compensation or process adjustment for a manufacturing device |
| MFGDEV | Identifies a manufacturing device |
| TOOLDF | Identifies a tool for a manufacturing device |
| CLMPID | Identifies a part holding clamp |
| CLMPSN | Identifies the serial number of a part holding clamp in printable text |
| DMEID | Identifies a CMM in printable text |

-continued

| Command | Function |
| --- | --- |
| DMESWI | Identifies software for a CMM in printable text |
| DMESWV | Identifies the version of software used in a CMM printable text |
| FIXTID | Identifies a part holding fixture |
| FIXTSN | Identifies the serial number of a part holding fixture |
| LOTID | Identifies a workpiece by lot identifier |
| OPERID | Identifies an operator of a CMM |
| PARTID | Identifies a workpiece in printable text |
| PARTRV | Identifies a revision level for a workpiece |
| PARTSN | Identifies a part by serial number |
| PLANID | Identifies an inspection plan |
| PREVOP | Identifies a previous operation in printable text |
| PROCID | Identifies an inspection procedure in printable text |
| EVAL | Compares a feature to a tolerance |
| OUTPUT | Outputs results of a measurement or evaluation |
| PSTHRU | Outputs statements in a parts program without interpretation or execution |
| REPORT | Places additional information in an output file |
| VFORM | Identifies the data content of the vendor output |
| DMIS | Specifies when statements are processed or not processed by the CMM |
| DMEHW | Relates specific CMM hardware information to another device to control execution of movement and measurement commands |
| DMESW | Controls data or the processing of data in a parts file |
| ENDAT | Identifies the end of the data stream |

The manner in which these DMIS commands can be used in a part file is seen in FIG. 5. For example, line 17 defines a plane in cartesian coordinates. Line 18 specifies that the plane will be inspected by measuring four points which are defined in lines 19 through 22. When the four points are measured, the program creates a variable called FA(DATA) which can be used to translate the Z origin. Line 24 adjusts the coordinate system so that every point on the plane has a zero Z coordinate.

When making measurements with the apparatus, the operator first calibrates the probe on a standard object such as a sphere of a known diameter. When the probe is calibrated, the operator places the workpiece to be measured in the apparatus and measures selected features of the workpiece and compares the measurements with a drawing of the device. In order to set parameters for determining tolerances, and to determine whether other workpieces are within the set tolerances, the operator creates a coordinate system on the workpiece. For example, if the blueprint of the part specifies that a particular circle is 10 inches from a particular corner, that corner can be defined as the origin of the coordinate system for the part. Using that origin, the machine coordinate system can be translated to a part coordinate system using known techniques.

The operator then defines tolerances for various dimensions. The operator sets the tolerance, which might be +/−0.005 inch, for example, and instructs the system to determine whether or not a particular workpiece is in tolerance. The results of the measurements can be sent to the display 40, the printer 42, or a file in memory.

The system can also be used to define imaginary features of the invention using certain measurements of the workpiece. For example, an imaginary line can be constructed by measuring two planes and calculating their theoretical intersection.

Figure 6:
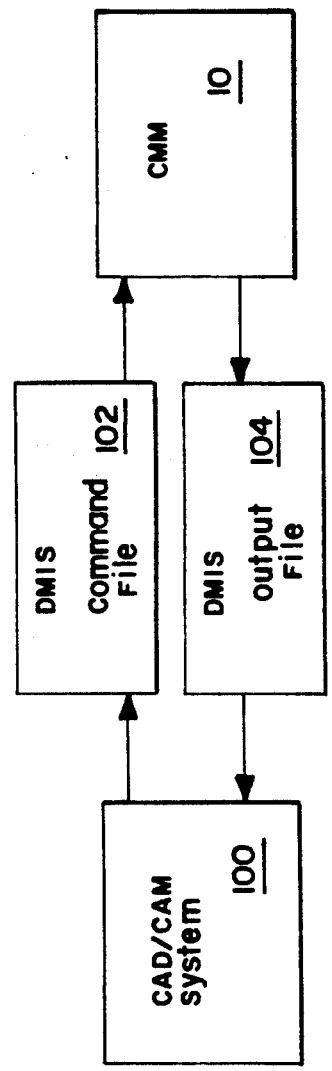
FIG. 6 is a block diagram of the apparatus of FIG. 1 in an on-line system with CAD/CAM equipment.

The apparatus 10 is useful in automated factories because it uses a standard technique of communication of inspection methods from a source to nodes in the manufacturing process. Because it uses standard syntax such as DMIS, it can be used on-line, as seen in FIG. 6, and can easily communicate with many machines used in the manufacturing process. A DMIS command file 102 can be sent from a CAD/CAM machine 100 to the CMM 10, and a DMIS output file 104 can be sent from CMM 10 to the CAD/CAM 100 after the part is inspected. With this system, the CAD/CAM 100 can wait for the results of an inspection before it performs the next operation, and corrective action can be taken immediately, if needed.

Prototypes can be designed in a similar manner using a CAD system. The typical cycle of prototype build from design to actual prototype build and inspection is done by many people in different departments. With this invention, a designer might design a part on a CAD/CAM system, and the CAD/CAM system can also be used to design a database for inspection of the part. Then with the aid of a standard, known module, a part program can be generated to fabricate a prototype of the part by loading the part program into an automated machine tool. After fabrication, the part is taken to a CMM or manual inspection department. The results of the inspection are sent to the designer, who makes appropriate changes in the design and repeats the cycle. With the apparatus of this invention, the entire process is simplified and expedited because all of the machines use a standard syntax. The CMM can be run on-line because the results of the inspection can be sent directly to the manufacturing controller in real time. In this manner, the CAD/CAM system, the machine tool and the inspection device can be networked together for efficient operation.

The many advantages of the invention are now apparent. The automated, precision measurement and inspection methods and apparatus perform basic measurement functions in response to commands in a standard syntax format such as DMIS, without translating the DMIS or other standard commands into another format. Also, the automated measurement and inspection methods and apparatus can create files for particular workpieces without manual programming. Moreover, the automated measurement and inspection methods and apparatus can create CAD/CAM files for particular workpieces which use DMIS protocol, without translating the DMIS syntax to another protocol.

While the principles of the invention have been described above in connection with specific apparatus and applications, it is to be understood that this description is made only by way of example and not as a limitation on the scope of the invention.

We claim:

1. Apparatus for measuring an object comprising
   (a) a frame assembly having a reference table for supporting the object,
   (b) a robotics unit secured to said frame assembly, said robotics unit having movable probe means, said probe means generating output signals when said probe means contacts the object, and
   (c) machine control means for controlling said probe means, said machine control means having
      (i) a processor means for processing said probe output signals, controlling said robotics unit and said machine control means, and analyzing data of the object instructions received from memory means, (ii) first input means connected to said probe means for placing said probe output signals in said processor means, (iii) second input means for programming and controlling said processor means, (iv) first output means connected to said processor means for controlling the movement of said probe means, (v) second output means for displaying information calculated in said processor means, (vi) a program for operating said robotics unit in predetermined ways, said program being responsive to a memory containing a substantial number of instructions in a widely-used command syntax said instructions existing in a memory, and (vii) a part file containing said commands, whereby said part file is executed by the program embodied in the memory of the robotics unit without the use of either preprocessors and/or postprocessors.

2. The apparatus of claim 1 wherein said control means utilizes said probe means to analyze selected points in response to FEAT/POINT commands in said part file, selected points in a circle in response to FEAT/CIRCLE commands in said part file, selected points in a line in response to FEAT/LINE commands in said part file, selected points in a sphere in response to FEAT/SPHERE commands in said part file, selected points in a cylinder in response to FEAT/CYLINDER commands in said part file, selected points in a plane in response to FEAT/PLANE commands in said part file, and selected points in a cone in response to FEAT/CONE commands in said part file.

3. The apparatus of claim 1 wherein said program utilizes instructions in DMIS.

4. Apparatus for measuring an object comprising (a) a frame assembly having a reference table for supporting the object, (b) a robotics unit secured to said frame assembly, said robotics unit having movable probe means, said probe means generating output signals when said probe means contacts the object, and (c) machine control means for controlling said probe means, said machine control means having (i) a processor means for processing said probe output signals, controlling said robotics unit and said machine control means, and analyzing data of the object instructions received from memory means, (ii) first input means connected to said probe means for placing said probe output signals in said processor means, (iii) second input means for programming and controlling said processor means, (iv) first output means connected to said processor means for controlling the movement of said probe means, (v) second out put means for displaying information calculated in said processor means, (vi) a program for operating said robotics unit in predetermined ways, said program being responsive to a substantial number of commands in a widely-used command syntax, and (vii) means for generating a part file containing said commands as the object is analyzed, said part file being executable by the robotics unit without the use of dedicated translators, compilers and the like.

5. The apparatus of claim 4 wherein said control means causes said probe means to measure selected points in a circle in response to FEAT/CIRCLE commands in said part file, selected points in a line in response to FEAT/LINE commands in said part file, selected points in a sphere in response to FEAT/SPHERE commands in said part file, selected points in a cylinder in response to FEAT/CYLINDER commands in said part file, selected points in a plane in response to FEAT/PLANE commands in said part file, and selected points in a cone in response to FEAT/CONE commands in said part file.

6. The apparatus of claim 4 wherein said program utilizes instructions in DMIS.

7. A system for designing a part from a workpiece comprising (a) apparatus for measuring selected points on the workpiece with a program which is response to part files having a substantial number of commands in a widely-used command syntax, said apparatus having means for generating part files from an existing part file or through an operator as the workpiece is measured;

(b) computer-aided design or manufacturing apparatus having means for generating part files in said widely-used command syntax as the part is designed; and (c) means for transferring said part files between said measuring apparatus and said computer-aided design or manufacturing apparatus, whereby design of the workpiece is changed after measurement and then measured again, all without the use of either preprocessors and/or postprocessors.

8. Apparatus for measuring an object comprising (a) a frame assembly having a reference table for supporting the object, (b) a robotics unit secured to said frame assembly, said robotics unit having movable probe means, said probe means generating output signals when said probe means contacts the object, and (c) machine control means for controlling said probe means, said machine control means having (i) a processor means for processing said probe output signals, controlling said robotics unit and said machine control means, and analyzing data of the object instructions received from memory means, (ii) first input means connected to said probe means for placing said probe output signals in said processor means, (iii) second input means for programming and controlling said processor means (iv) remote control means for controlling said processor means, said remote control means, including means for defining operations which the robotics unit performs, and separate means for defining the manner in which said operations are executed, (v) first output means connected to said processor means for controlling the movement of said probe means, and (vi) second output means for displaying information calculated in said processor means.

9. The apparatus of claim 8 wherein said remote control defining means comprises means for defining points, lines, planes and geometric shapes, including circles, ellipses, rectangles, cubes and cones.

10. The apparatus of claim 8 wherein said remote control means for defining the manner in which operations are performed comprises means for starting operations, means for stopping operations, and means for performing a single step in an operation.

11. The apparatus of claim 8 wherein said remote control means comprises a first plurality of dedicated keys for defining said operations, and a second plurality of dedicated keys for defining the manner in which said operations are executed.

12. The apparatus of claim 11 wherein said first plurality of dedicated keys are arranged on a first keypad which is physically separated from said second plurality of dedicated keys, said second plurality of dedicated keys being arranged on a second keypad.

* * * * *